(12) United States Patent
Robert

(10) Patent No.: US 7,334,764 B2
(45) Date of Patent: Feb. 26, 2008

(54) ANCHORING DEVICE FOR FIXING ELEMENTS OF A PARTICULAR TYPE ON A FLAT SURFACE

(75) Inventor: François Robert, Sene (FR)

(73) Assignee: FR Nautisme, Lorient (FR)

(*) Notice: Subject to any disclaimer, the term of this patent is extended or adjusted under 35 U.S.C. 154(b) by 44 days.

(21) Appl. No.: 10/534,831

(22) PCT Filed: Nov. 10, 2003

(86) PCT No.: PCT/FR03/03346

§ 371 (c)(1),
(2), (4) Date: Dec. 13, 2005

(87) PCT Pub. No.: WO2004/046581

PCT Pub. Date: Jun. 3, 2004

(65) Prior Publication Data

US 2006/0124813 A1 Jun. 15, 2006

(30) Foreign Application Priority Data

Nov. 13, 2002 (FR) .................................. 02 14146

(51) Int. Cl.
*A47F 5/08* (2006.01)

(52) U.S. Cl. ................ 248/231.9; 248/925; 248/205.1; 114/230.29; 410/116

(58) Field of Classification Search ............. 248/231.9, 248/231.91, 506, 500, 205.1, 925; 114/230.29, 114/230.26; 24/573.09, 16 PB
See application file for complete search history.

(56) References Cited

U.S. PATENT DOCUMENTS

| | | | | |
|---|---|---|---|---|
| 1,783,873 A * | 12/1930 | Duncan, Jr. | .............. | 248/188.9 |
| 2,559,064 A * | 7/1951 | Cunningham | ............... | 383/66 |
| 3,122,120 A | 2/1964 | Jorgenson | | |
| 3,328,229 A * | 6/1967 | Windecker | ................... | 156/66 |
| 3,833,241 A * | 9/1974 | Acosta | ........................ | 410/12 |
| 4,297,963 A * | 11/1981 | Beacom | ................ | 114/230.29 |
| 4,630,982 A * | 12/1986 | Fenner | ....................... | 410/102 |
| 5,775,664 A * | 7/1998 | Martin | ...................... | 248/500 |
| 5,887,840 A | 3/1999 | Hoffman | | |
| 6,000,107 A | 12/1999 | West | | |
| 6,241,440 B1 * | 6/2001 | Orlebeke | .................... | 410/106 |
| 6,389,659 B1 | 5/2002 | Jacobs | | |

* cited by examiner

Primary Examiner—Anita M. King
(74) Attorney, Agent, or Firm—Young & Thompson

(57) ABSTRACT

The invention concerns an anchoring device (1) for fixing elements of a particular type on a flat surface (3), preferably tensioned, such as shrouds, riggings, cable. The device is in the form of two mutually secured plates (3, 4), one (3) generally designed to be pressed against an inner surface of a flat surface (2), being integral with a socket (5) capable of being positioned opposite a perforation of the flat surface (2), the socket (5) containing a bundle of flexible fibers (6) flared at one end to form at least one layer (6A) enclosed between the two plates (3, 4), the bundle of fibers (6) projecting outside the socket (5) to act as an anchoring point to an element of a particular type connected to the bundle (6).

19 Claims, 5 Drawing Sheets

ANCHORING DEVICE FOR FIXING ELEMENTS OF A PARTICULAR TYPE ON A FLAT SURFACE

FIELD OF THE INVENTION

The present invention relates to an anchoring device on a wall for the securement of elements of any nature, preferably subject to tension, such as shrouds, riggings, cable, various superstructure members or the like.

BACKGROUND OF THE INVENTION

Anchoring devices used until now, particularly in the nautical field for the securement of pulleys, shrouds, riggings, cables or the like are devices of heavy weight compared to the mechanical strength they can offer.

A known anchoring device is particularly constituted by a plate and a counter-plate disposed on opposite sides of the wall of the bridge and assembled by screwing. The plate is over-mounted with a rigid anchoring ring. Such an anchoring device requires two people for its installation and requires a large number of holes in the bridge, which is never satisfactory from the standpoint of mechanical strength of the bridge. Moreover, the presence of a rigid anchoring ring limits the possibilities of securement of the connected element and does not permit orientation about 360°.

There is moreover known, from the patents EP 1 053 933 and WO/1.42682, anchoring devices in which the anchoring ring is disconnected from the rest of the device such that the resistance to traction is limited.

Other anchoring devices, such as those described in U.S. Pat. Nos. 3,122,120, 6,389,659, 5,887,840 and 6,000,107 have complicated constructions but which up until now have not given complete satisfaction.

OBJECTS OF THE INVENTION

An object of the present invention is to provide an anchoring device adapted to work about 360° by covering the line delimited by a half sphere, the design of this device requiring a single perforation of the wall that receives the device from its mounting and permitting rapid mounting of such a device by a single person.

Another object of the present invention is to provide an anchoring device whose design facilitates its un-mounting and permits its application on any type of profiled support.

SUMMARY OF THE INVENTION

To this end, the invention has for its object an anchoring device on a wall for the securement of elements of any type, preferably subject to tension, such as shrouds, rigging, cable, characterized in that the device is present in the form of two plates secured together, one of these plates, generally adapted to be applied against the internal surface of a wall, being secured to a socket adapted to be positioned facing a hole in said wall, this socket containing a bundle of flexible fibers flared at one end to form at least one layer gripped between the two plates, the bundle of fibers projecting outside the socket to serve as an anchoring point for any type of element connected to the bundle.

The design of the mentioned anchoring device permits obtaining an extremely short mounting and replacement time, these operations being adapted to be performed by a single person. Moreover, the anchoring point of the elements to be connected being in the form of a bundle of fibers, it is possible to work about an orientation extending over 360° in the corresponding mass of a semi-sphere.

Finally, the device can have an extremely low weight, of the order of 140 grams, whilst offering resistance to traction of about 13 tons.

BRIEF DESCRIPTION OF THE DRAWINGS

The invention will be better understood from a reading of the following description of examples of embodiment, with reference to the accompanying drawings, in which.

DETAILED DESCRIPTION OF THE INVENTION

Figure 1:
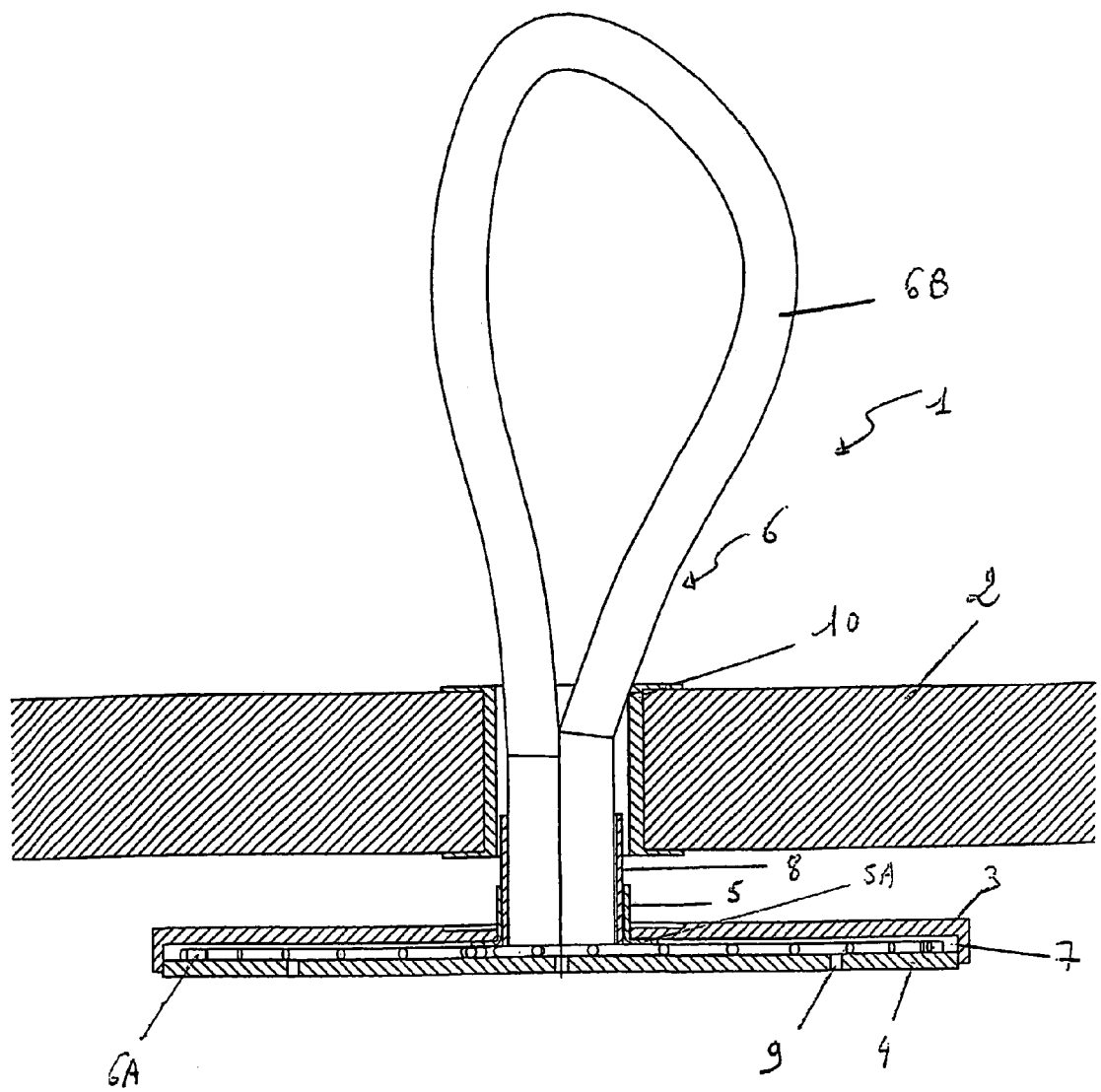
FIG. 1 is a cross-sectional view of an anchoring device in the course of installation on a wall such as the wall of a ship's bridge.
Figure 2:
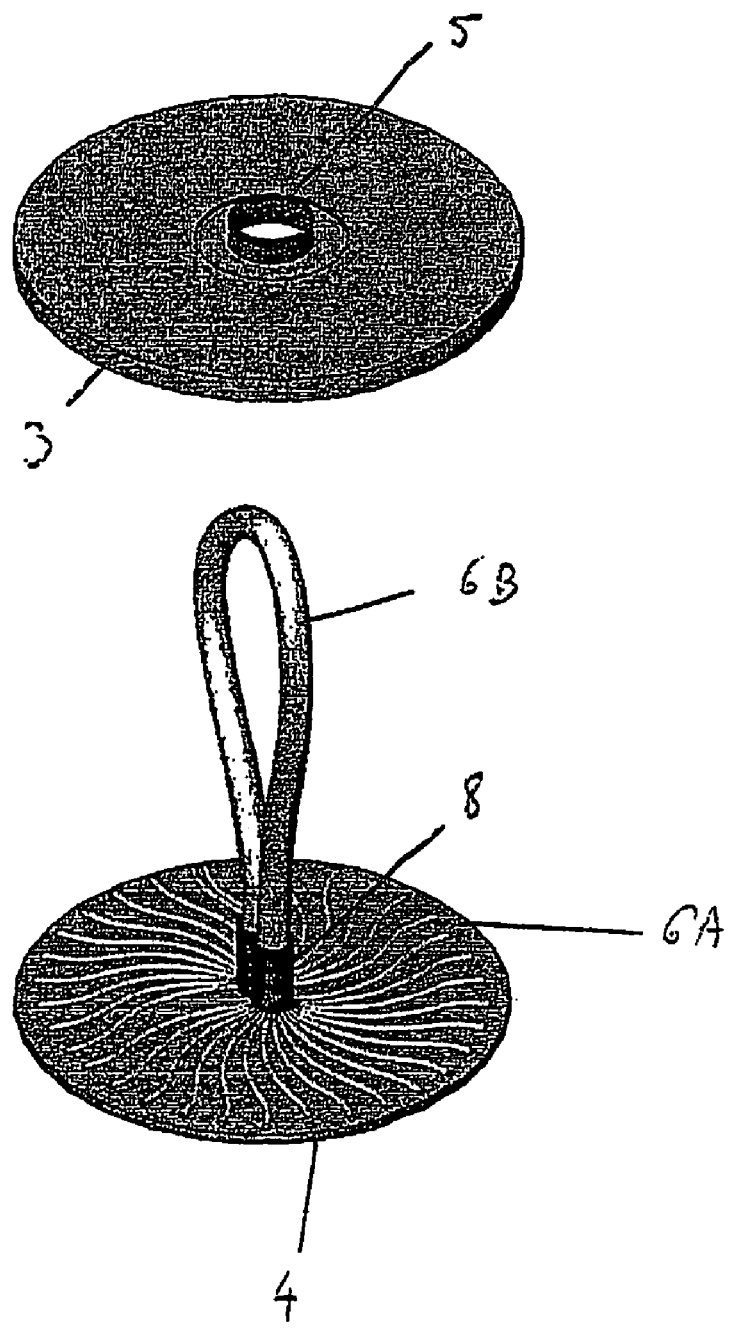
FIG. 2 shows a perspective view of the device in the exploded condition of its constituent elements.
Figure 3:
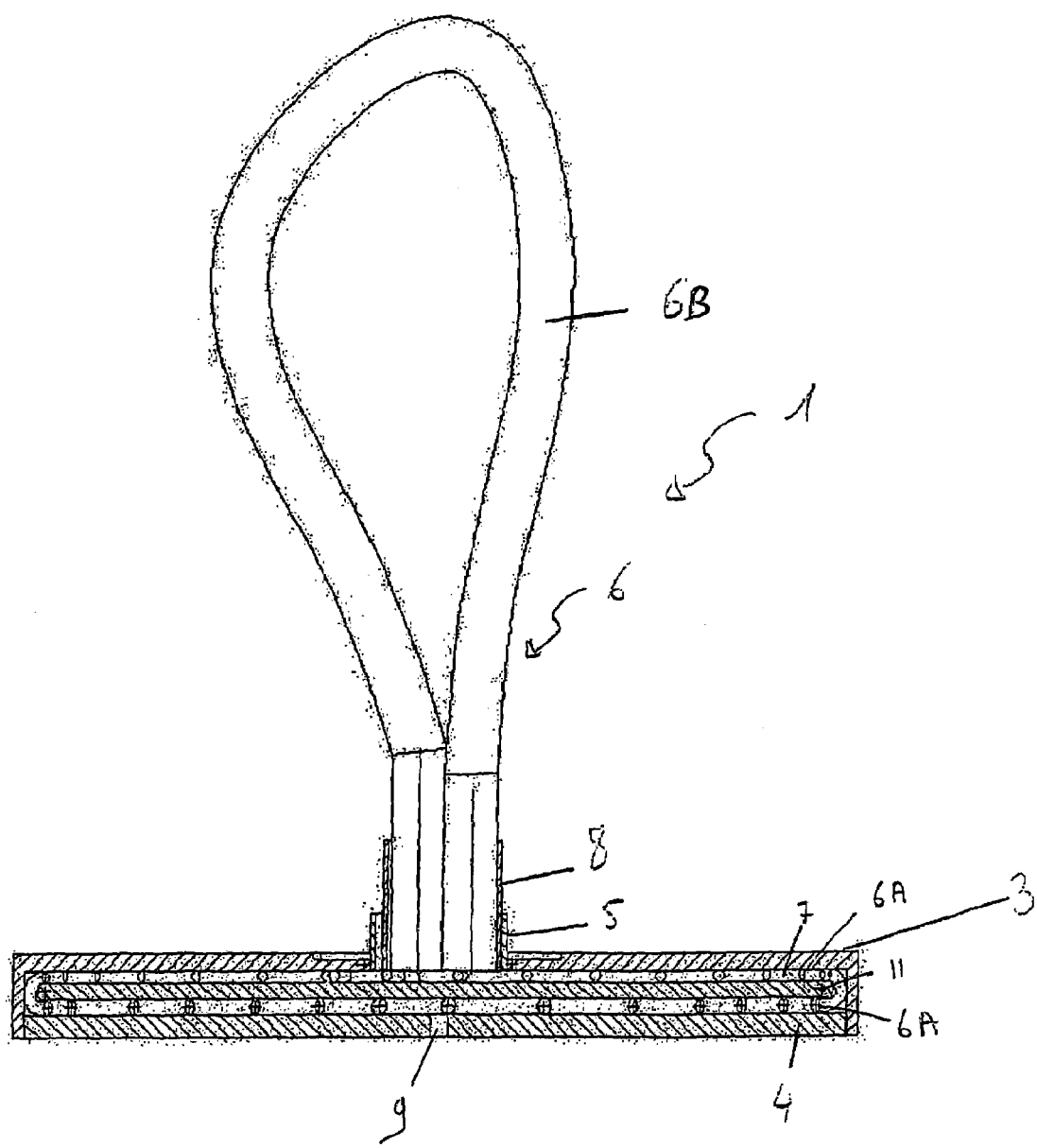
FIG. 3 shows a cross-sectional view of another embodiment of the device.
Figure 4:
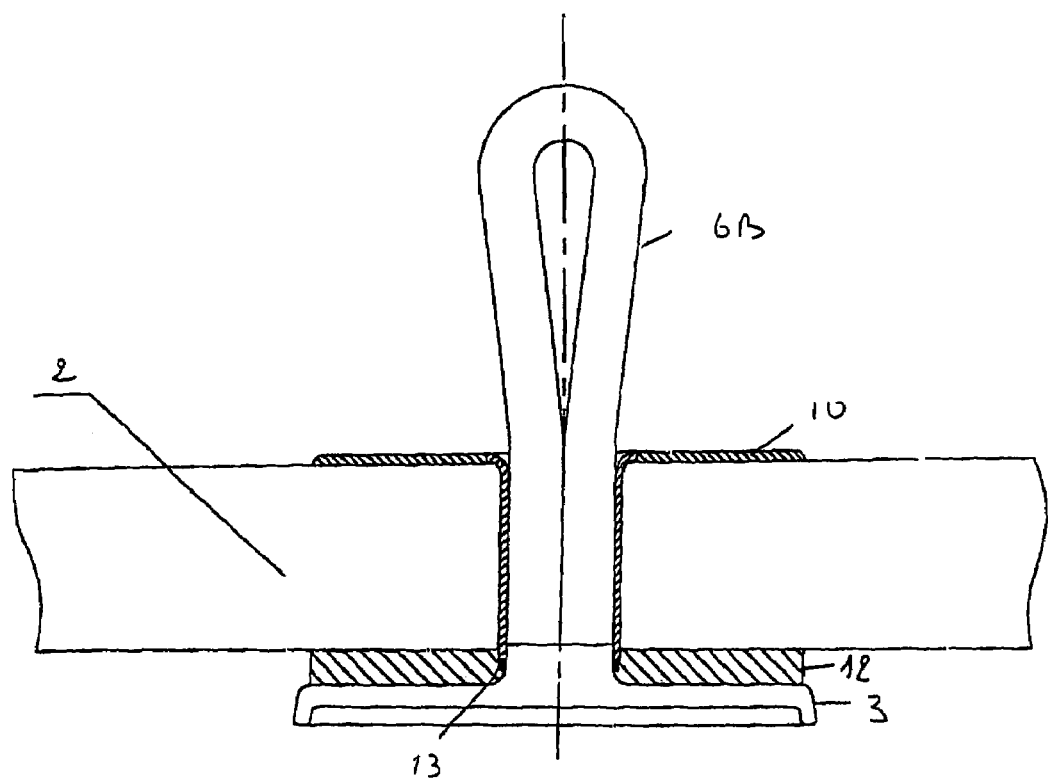
FIG. 4 shows a cross-sectional view of another embodiment of an anchoring device in the condition mounted on a wall, such as the wall of the bridge of a ship.

As mentioned above, the anchoring device 1, according to the invention, is preferably adapted to be inserted through a hole in the wall 2 such as the wall of a bridge, the simple application on a wall not being excluded. This anchoring device 1 permits the securement of elements of any nature, generally subject to tension, such as shrouds, rigging, cable. The anchoring device 1 is present in the form of two plates 3 and 4 secured together. The plate 3, generally adapted to be applied against the internal surface of a wall 2, is secured to a cylindrical socket 5 adapted to pass partially through the wall 2 by means of the hole provided in this wall. The socket 5 can be made in a single piece with the plate 3 for application on the wall (FIGS. 3 and 4). In an equivalent manner, socket 5 and plate 3 can be made in the form of two separate pieces. This socket 5 contains a bundle 6 of flexible fibers flared at one end in the form of a star, as shown in FIG. 2, to form a layer 6A gripped between the two plates 3 and 4. The bundle 6 of fibers moreover projects outside the socket 5 to serve as an anchoring point for an element of any type connected to the bundle 6.

In the illustrated examples, this plate 3 for application against the internal surface of a wall 2 is a plate preferably in the form of layered carbon. The plate 4, opposite the plate 3 for application against the wall 2, is also present preferably in the form of layered carbon or layered glass. The fibers of the layer 6A of fiber are themselves disposed between said plates in a radial arrangement relative to the socket 5. This radiating arrangement can be achieved by means for flaring the fibers distributed over all the surface of said plates, as shown in FIG. 2, or over a portion of this surface as a function of the applications. The plates 3 and 4 and the layer 6A of fibers are secured together by a binder 7 such as a polymerizable resin. This resin is preferably a resin of the epoxy type or of the methacrylate type. The plate 4 opposite the plate 3 for application against the wall 2 can comprise drainage openings 9 for the evacuation of excess binder during securement together of the plates 3 and 4 and of the layer 6A of fibers. Thanks to this mounting, the flared fibers are both retained by gluing and by friction because of the mechanical mounting. As a result, there is an increase of the mechanical resistance of the assembly. The portion of bundle 6 of fibers passing through the socket 5 is itself held within a sleeve 8, preferably thermo-shrinkable, this sleeve 8, disposed within the socket 5, is thus disposed coaxially of the socket 5. The projecting portion 6B of the bundle 6 of fibers, outside the socket 5, itself has the form of a loop. In one embodiment, not shown, this projecting portion could have been in an analogous manner constituted by a single strand bundle, the connection being adapted to be carried out for example with the element to be connected by means of a splice. Generally, this fiber bundle is present in the form of fibers preferably braided. However, in a similar way, such a bundle of fibers can be present in the form of a bundle of unbraided fibers. These fibers are preferably polyester or polyethylene high modulus fibers.

The production of such an anchoring device can take place as follows. Starting with a bundle of fibers, preferably of high modulus polyester or polyethylene, there is created a loop by simple bending of said bundle. About the region in which the strands of the bundle extend parallel, there is mounted a sleeve 8, preferably thermo-shrinkable. This sleeve is thus emplaced on the fiber bundle threaded within said sleeve 8, then heated so as to shrink it. The present of this thermo-shrinkable sleeve 8 permits forcing the fibers of the bundle between each other to prevent any disturbance of the fibers which are thus positioned all at the same length. Moreover, such a sleeve permits avoiding migration of the binder toward the projecting portion of said binder during securement of the plates to each other. Once the bundle of fibers is thus prepared, it can be incorporated in a first piece constituted by the assembly formed by the male socket 5 and the plate 3 for application against the wall 2. The male socket 5 and the plate 3 are made of a single piece or have previously been cemented together. To this end, the socket 5 is provided at its base with a shoulder 5A that bears against the internal wall of that plate 3 upon application against the wall 2. The socket 5 thus permits protecting the carbon plate 3 at the level of its opening, permitting the passage of the fibers as well as the fibers themselves, particularly at their bend. The end of the fiber bundle is then flared to position the fibers in a configuration similar particularly to that shown in FIG. 2. A binder, such as a resin of the epoxy type or methacrylate type, is then applied to the assembly of the fibers. This resin can be present in the form of a film active at a temperature generally about the order of 80° C. There can also be used a process of production by wet means. Once the fibers of the bundle have been flared and the binder introduced, there is then pressed against said layer the plate 4 which is opposite to the plate 3 for application against the wall 2. The flared fibers thus extend in the form of a layer in the space provided between said plates. The securement of the plates 3 and 4 can then be carried out. This securement takes place generally under vacuum and at high temperature. This vacuum is held for about 5 hours. There is then observed a first hardening of the resin which polymerizes at a temperature comprised between 25° C. and 80° C. Heating can be repeated to increase the modulus of resistance of the resin. There is observed, because of the mode of production of such an anchoring device and the design of this device, that the holding of the fibers takes place principally by friction and not by gluing. The gluing can however be improved by a surface treatment of the fibers. Once the plates are secured together, the anchoring device is ready to be installed. The emplacement of an anchoring device takes place in an extremely easy manner. Thus, it suffices to thread the socket 5 within a hole in the wall 2, if desired provided with a female socket 10 to permit the emplacement of such a device. As a result, such a device is easily removable. In this particular embodiment of the invention, the socket 5 can be a screw-threaded socket so as to coact with a screw-threaded female socket 10 disposed in a hole in the wall 2. This socket 10, called female, is held by gripping in the hole in the wall 2. The presence of this female socket 10 permits avoiding any alteration of the wall 2 as to its junction zone with an anchoring device. Thus, and to this end, the female socket 10 comprises at one of its ends an edge covering the wall.

Figure 5:
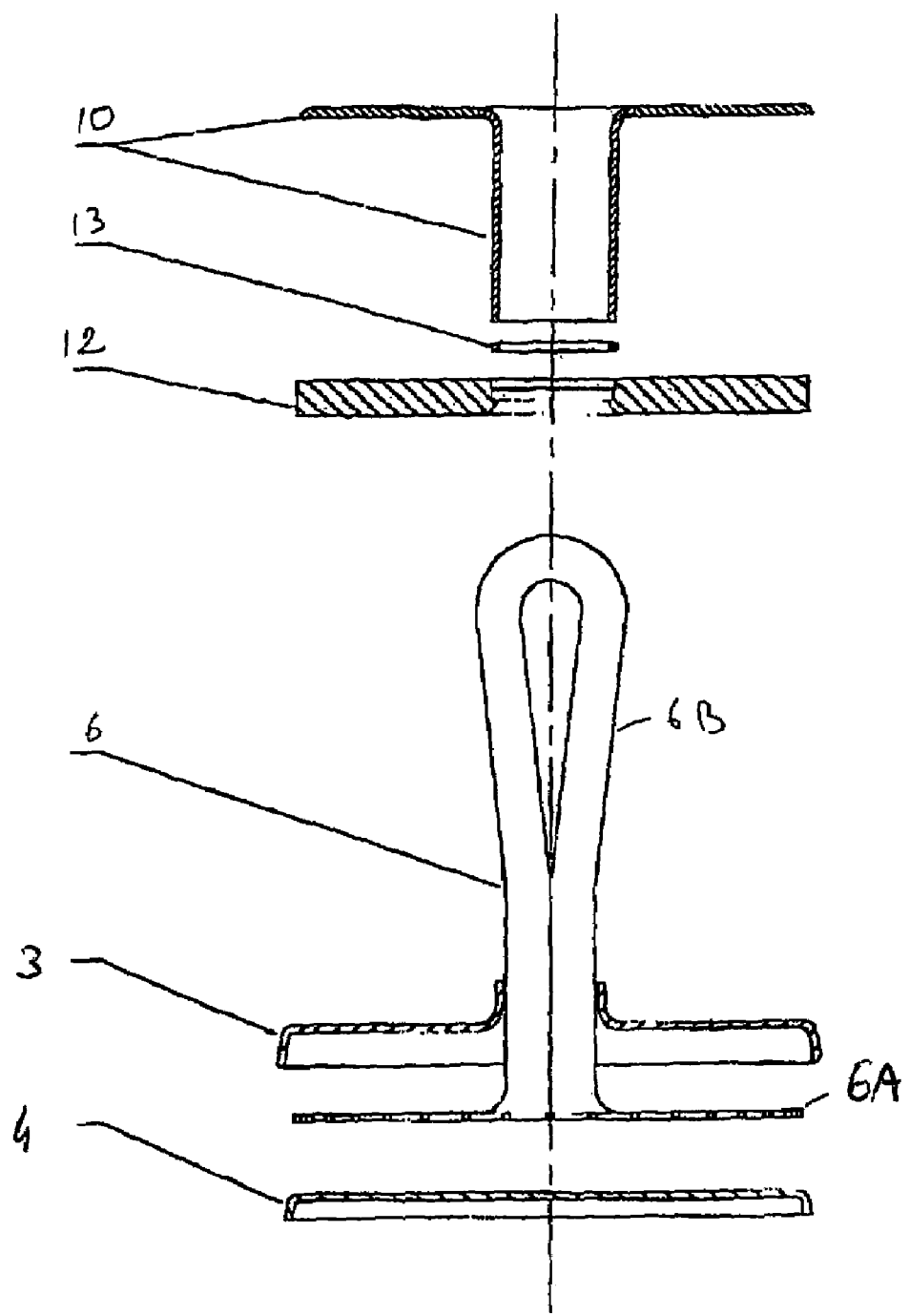
FIG. 5 shows in cross-sectional view the device of FIG. 4 in the exploded condition of the elements constituting it.

In another embodiment of the invention, shown in FIGS. 4 and 5, the socket 5 is threaded within a hole in the wall 2 whose outlet, on the internal surface of the wall, is delimited by an annular plate 12 forming the internal surface of the wall against which the plate 3 for application of the device is applied. Thus, and in this case, the internal surface of the wall is so arranged as to receive the device. This annular plate 12 is preferably glued to the rest of the wall to form a single and same assembly. The socket 10, threaded through the hole in the wall 2, thus projects through said annular plate 12 and permits its centering relative to the rest of the hole provided in the wall 2. This annular plate 12 is provided with a throat and/or an annular shoulder serving for the reception of a toric joint 13 positioned about the socket 5 so as to obtain a device connected in a sealed manner to the wall 2. It can also be envisaged to cement one or the other of the surfaces of the plate 3 and the plate 5 facing each other and applied against the other. There can also be provided, in the plate 12, a shoulder serving for the reception by simple encasing of the end of the screw-threaded socket 10 through the hole in the wall and projecting into the recess of the annular plate 12. The mounting, according to that shown in FIGS. 4 and 5, will be more particularly useful in the case in which it is necessary to obtain a sealed mounting between the device and the wall. During this handling of the device, it suffices to disconnect the plate 3 from the plate 12 so as to disassemble the device and proceed to its replacement.

Independently of the embodiment used, such a mounting can be carried out by a single and same person. The operation of mounting lasts only several minutes. The same is true of disassembly. Once the anchoring device is in place, the projecting end of the bundle of fibers can thus be connected to an element of any nature. Because the connecting element is present in the form of a bundle of single strand fibers or in the form of a loop, as shown in the figures, there results the possibility of orientation of this anchoring point about 360°.

In another embodiment shown in FIG. 3, a supplemental plate 11 is inserted between the plates 3 and 4. The flared fibers extend over one surface of said intermediate plate 11 before being pressed against the other surface of said plate. Thus, the fibers envelope said intermediate plate 11 and form two layers. There results a double wedging of the fibers of the bundle and an increase of the frictional surface, without increasing the size of the device.

The invention claimed is:

1. An anchoring device (1) for anchoring on a wall (2) for the securement of elements of any type, characterized in that the device comprises two plates (3, 4) secured to each other, one (3) of said two plates (3, 4), generally adapted to be applied against the internal surface of a wall (2), being secured to a socket (5) adapted to be positioned facing a hole of said wall (2), said socket (5) containing a bundle (6) of flexible fibers flared at one end to form at least one layer (6A) gripped between the two plates (3, 4), the bundle (6) of fibers projecting outside the socket (5) to serve as the anchoring point for an element of any type connected to the bundle (6).

2. The anchoring device (1) according to claim 1, characterized in that the plates (3, 4) and the layer (6A) of fibers are secured together by a binder (7).

3. The anchoring device (1) according to claim 1, characterized in that the socket (5) and the plate (3) for application against the wall with which the socket (5) is connected, are made in a single piece.

4. The anchoring device (1) according to claim 1, characterized in that the anchoring device is provided, between the plates (3 and 4), with a supplemental plate (11), the flared fibers of the bundle of fibers extending over a surface of said intermediate plate before being pushed back against the other surface of said plate.

5. The anchoring device (1) according to claim 1, characterized in that a portion of the bundle (6) passing through the socket (5) is held within a sleeve (8), preferably thermo-shrinkable.

6. The anchoring device (1) according to claim 1, characterized in that a projecting portion (6B) of the bundle (6) of fibers outside the socket (5) has the shape of a loop.

7. The anchoring device (1) according to claim 1, characterized in that the socket (5) is threaded within a hole in said wall (2) which is provided with a female socket (10) to render the device easily movable.

8. The anchoring device (1) according to claim 7, characterized in that the socket (5) is screw-threaded so as to coact with a screw-threaded female socket (10) disposed within a hole in the wall (2).

9. The anchoring device (1) according to claim 1, characterized in that the socket (5) is threaded within a hole in the wall (2) whose outlet, on the internal surface side of the wall, is delimited by an annular plate (12) forming the internal surface of the wall against which one of the plates (3) of the device bears.

10. The anchoring device (1) according to claim 9, characterized in that the annular plate (12) is provided with a throat and/or an annular shoulder serving for the reception of a toric joint (13) positioned about the socket (5) so as to obtain a device connected watertightly to the wall (2).

11. The anchoring device (1) according to claim 2, characterized in that the socket (5) and the plate (3) for application against the wall with which the socket (5) is connected, are made in a single piece.

12. The anchoring device (1) according to claim 2, characterized in that the anchoring device is provided, between the plates (3 and 4), with a supplemental plate (11), the flared fibers of the bundle of fibers extending over a surface of said supplemental plate before being pushed back against an opposite surface of said intermediate plate.

13. The anchoring device (1) according to claim 2, characterized in that a portion of the bundle (6) passing through the socket (5) is held within a sleeve (8), preferably, thermo-shrinkable.

14. The anchoring device (1) according to claim 3, characterized in that a portion of the bundle (6) passing through the socket (5) is held within a sleeve (8), preferably thermo-shrinkable.

15. The anchoring device (1) according to claim 4, characterized in that a portion of the bundle (6) passing through the socket (5) is held within a sleeve (8), preferably thermo-shrinkable.

16. The anchoring device (1) according to claim 2, characterized in that a projecting portion (6B) of the bundle (6) of fibers outside the socket (5) has the shape of a loop.

17. The anchoring device (1) according to claim 3, characterized in that a projecting portion (6B) of the bundle (6) of fibers outside the socket (5) has the shape of a loop.

18. The anchoring device (1) according to claim 4, characterized in that a projecting portion (6B) of the bundle (6) of fibers outside the socket (5) has the shape of a loop.

19. The anchoring device (1) according to claim 5, characterized in that a projecting portion (6B) of the bundle (6) of fibers outside the socket (5) has the shape of a loop.

* * * * *